March 27, 1951 — V. P. DONNER — 2,546,390
CUTTING AND FEEDING MACHINE
Filed Sept. 15, 1948 — 4 Sheets-Sheet 1

Inventor
VERNE P. DONNER

March 27, 1951 V. P. DONNER 2,546,390
CUTTING AND FEEDING MACHINE
Filed Sept. 15, 1948 4 Sheets-Sheet 4

Inventor
VERNE P. DONNER

Patented Mar. 27, 1951

2,546,390

UNITED STATES PATENT OFFICE 2,546,390

CUTTING AND FEEDING MACHINE

Verne P. Donner, Palatine, Ill., assignor to Mid-Continent Metal Products Company, Chicago, Ill., a corporation of Illinois Application September 15, 1948, Serial No. 49,399

8 Claims. (Cl. 164—49)

This invention relates to a machine for feeding stock, for cutting blanks of the desired size from the stock, and for advancing the blanks in desired relationship to a fabricating machine or the like.

More particularly the invention deals with a machine which feeds a metal strip to a cutter which successively cuts off portions from the leading end of the strip to form blanks and which is equipped with an ejecting mechanism for quickly discharging the blanks in end to end relation at right angles to the strip from which they were cut.

Many fabricating machines require a controlled feeding of blanks thereto and it has been frequently necessary to provide such machines with magazines for containing the blanks in stacked relation. Such devices, however, require a separate handling or loading operation of the blanks between the machines which make the blanks and the blank fabricating machine in addition to the ejecting operation. The present invention eliminates such additional separate handling or loading operation and provides a compact combination machine which not only produces the blanks but feeds them in proper relationship to a fabricating machine or the like. The unit of this invention can be used with many different types of fabricating machines or blank-treating machines. It includes feed rollers which advance the stock from which the blanks are produced, a cutter for successively acting on the leading end of the stock, and ejection mechanism for feeding the cut blanks as soon as they are severed from the stock. The cutter itself is arranged so that it controls the advancement of the stock and the stock-advancing means may be continually driven so that all heretofore necessary complicated stopping and starting mechanisms, releasable grippers, and the like are eliminated. Thus, in accordance with this invention, a pair of stock feed rollers receive the stock therebetween and are continually driven in contact with the stock. However, the stock only advances as it is needed by the cutting mechanism, because this cutting mechanism has a stop for the leading end of the stock which terminates the forward movement of the stock by the rollers and causes the rollers to slip relative to the stock until the cutter is ready to act on the next segment of the stock.

It is, then, a feature of this invention to provide a simplified stock feeding, blank forming, and blank feeding apparatus free from heretofore necessary intermittently driven parts.

An object of the invention is to provide feeding and cutting machinery for metal fabricating machines wherein metal stock is successively cut into blanks and wherein the cut blanks are fed in proper relationship to the fabricating machine.

Another object of the invention is to provide a device which feeds a metal strip to a cutter that controls the advancement of the strip and severs the leading end of the strip to produce a blank, and wherein the blank is then rapidly ejected along a fixed path for direct feeding into a blank-fabricating machine.

A still further object of this invention is to provide a cutter with mechanism for automatically stopping the advancement of material to be cut without stopping the advancing mechanism.

A further object of the invention is to provide a cutter which automatically deposits cut material into the path of an ejecting device while maintaining the uncut material out of said path.

A still further object of the invention is to provide a machine which advances a strip of metal against a stop, which cuts off a desired portion of the leading end of the metal held against said stop, and which rapidly ejects the cut metal along a controlled path.

A still further object of the invention is to provide a cutter with a rockable bed receiving stock thereover to project forwardly from the leading end thereof and adapted to shift under the cutting action to hold the new leading edge of the strip against movement until the severed portion of the strip is ejected.

A still further object of the invention is to provide a cutting mechanism with a rockable bed receiving strip stock therethrough and coacting with an adjustable stop member in spaced relation from the forward edge thereof together with a cutter coacting with the leading edge of the bed to sever that portion of the strip between the stop member and said leading edge while simultaneously depositing the cut portion into an ejector mechanism and holding the strip against advancement to said stop until the cutter is retracted.

Other and further objects of the invention will be apparent to those skilled in the art from the following detailed description of the annexed sheets of drawings which, by way of a preferred example only, illustrate one embodiment of the invention.

Figure 4:
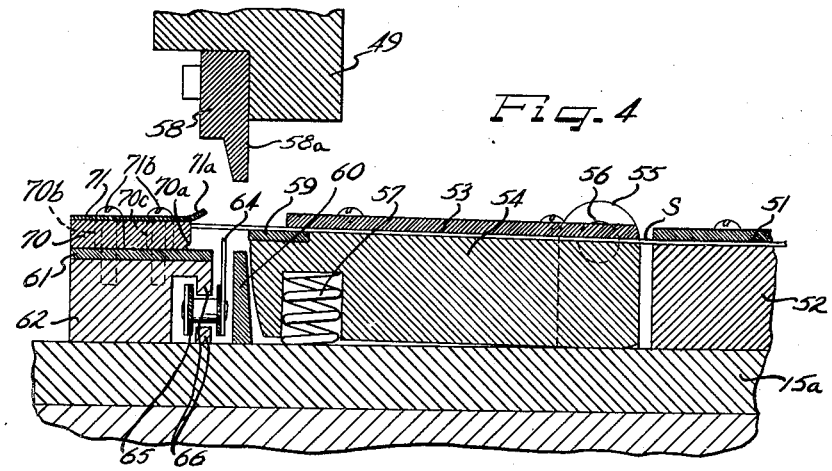
Figure 5:
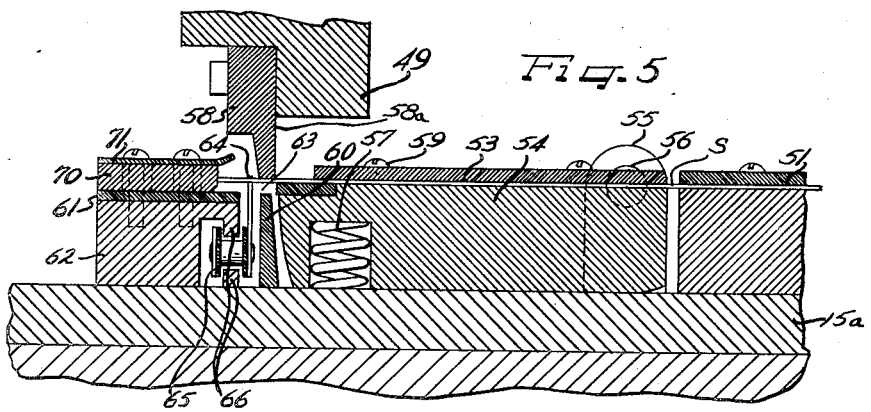
Figure 6:
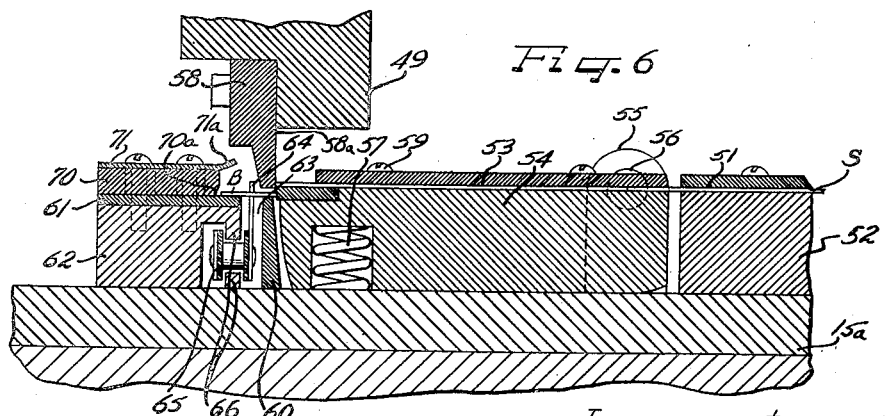

Figures 4, 5, and 6 are enlarged fragmentary cross-sectional views illustrating various operating positions of the cutter and ejector mechanism of the machine.

Figure 1:
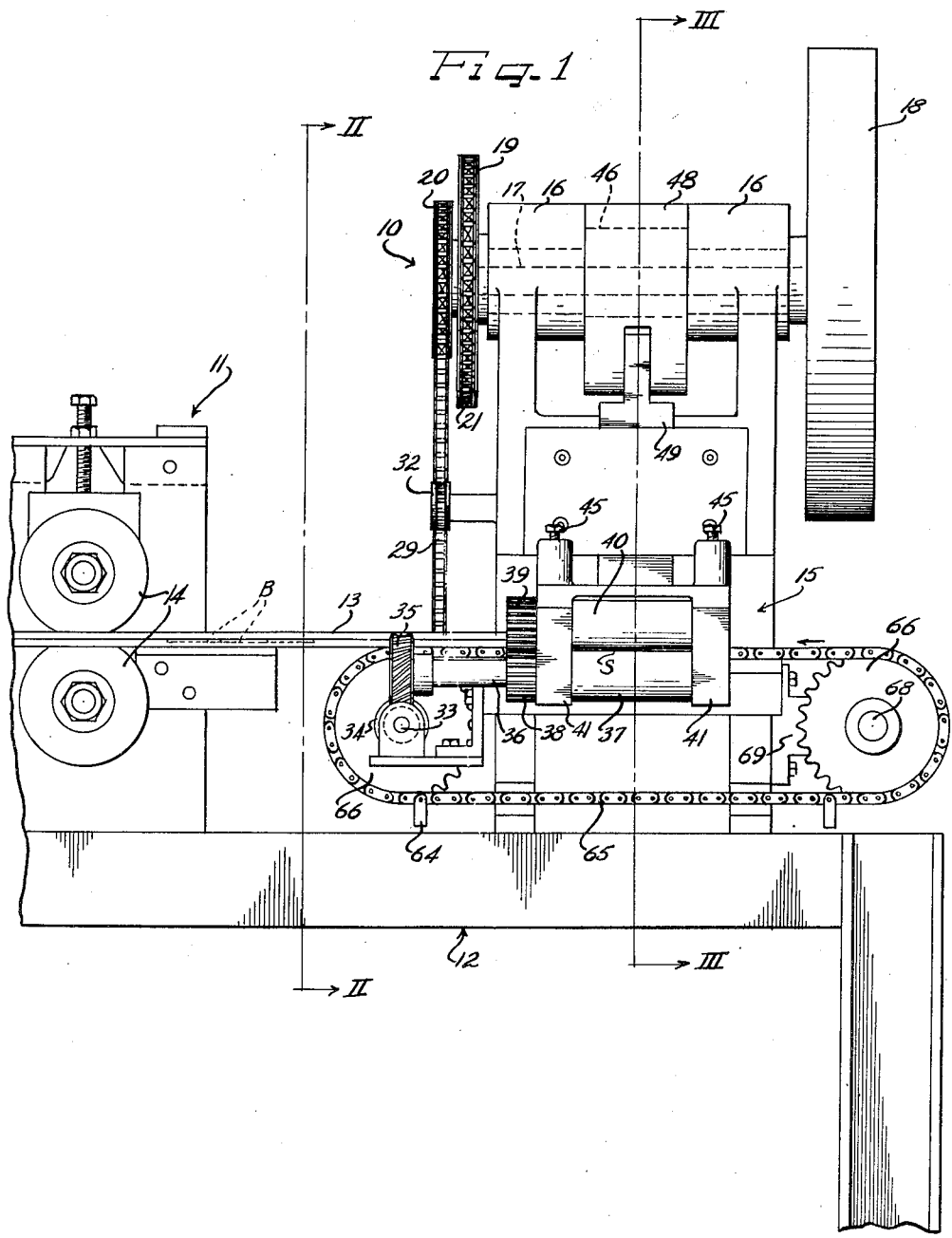
Figure 1 is a front side elevational view of the cutting and feeding machine of this invention and partially illustrating a fabricating machine for receiving blanks from the cutting machine.

As shown on the drawings:

As shown in Figure 1, the cutting and feeding machine 10 of this invention is mounted in operative relationship with a fabricating machine 11 on suitable base framework 12. The machine 10 receives an elongated metal strip S from a suitable source such as a roll (not shown), cuts blanks B from this strip, and advances the blanks in end to end relationship through a track 13 to the feed rolls 14 of the fabricating machine 11. It should be understood that many different types of fabricating machines can be used for receiving blanks in proper sequential relationship from the machine 10 of this invention. In the illustrated arrangement the blanks B are in the form of flat metal slugs to be fabricated into spring dowel pins or roll pins with cleft gaps.

Figure 2:
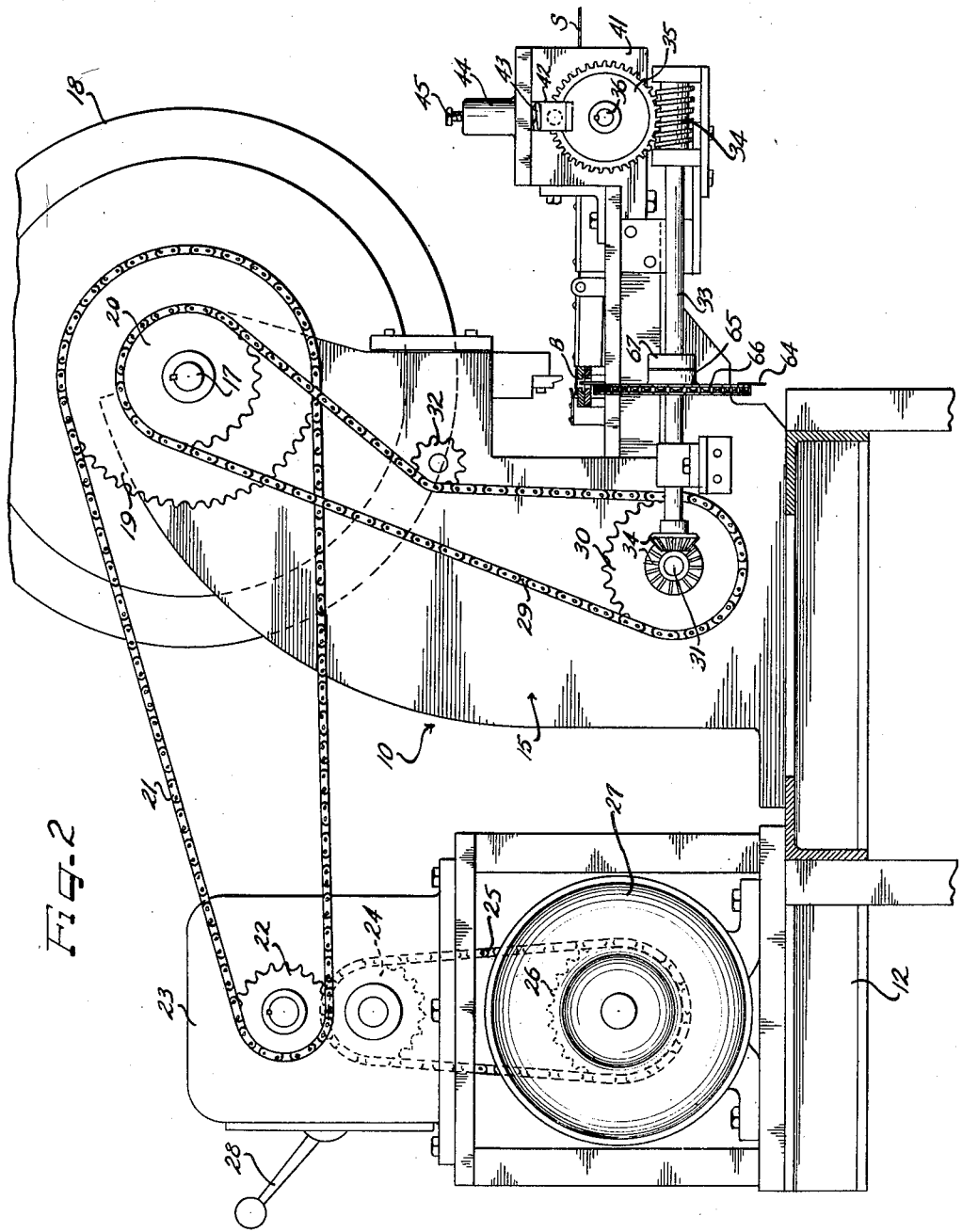
Figure 2 is an end elevational view of the machine of Figure 1 taken along the line II—II of Figure 1.

The machine 10 includes an upstanding frame 15 mounted on the base frame 12 and equipped with bearing supports 16, 16 at its upper ends. These bearing supports 16 are in spaced aligned relationship and rotatably support a shaft 17 which projects therebeyond and extends through the space therebetween. A flywheel 18 is secured on one end of the shaft 17 and sprockets 19 and 20 are secured on the other end of the shaft 17. The sprocket 19 is driven through a chain 21 from the driving sprocket 22 of a gear box 23. The gear box, in turn, is driven from a sprocket 24 by a chain 25 from the driving sprocket 26 of an electric motor 27 mounted on the base frame 12 as shown in Figure 2. The gear box 23 has a gear shifting control lever 28 for varying the speed of the sprocket 22 with reference to the sprocket 24.

The sprocket 20 on shaft 17 drives a chain 29 for actuating a sprocket 30 on a shaft 31. An idler sprocket 32 mounted on the frame 15 acts on the outside of the loop chain 29 to hold it in a tight out of the way position.

A transverse shaft 33 is driven from the shaft 31 through a pair of bevel gears 34. This shaft 33 has a worm 34 on the forward end thereof. The worm 34 drives a worm gear 35 on the axle 36 of a bottom feed roller 37. This axle 36 has a gear 38 thereon as shown in Figure 1 meshed with a gear 39 on the axle of a top feed roll 40. The bottom feed roll 37 is rotatably journaled in fixed bearings provided in supports 41 mounted on the frame 15. The top feed roller 40 is rotatably mounted in slidable bearing blocks 42 mounted in the upper ends of the supports 41 and loaded by springs 43 encased in housings 44 secured on top of the supports 41. Adjusting bolts 45 threaded through the tops of the housings 44 act on the springs 43 to regulate the compression thereof and thereby load the roller 40 to create a pressure nip relationship with the roller 37 so that the strip S fed therebetween will be frictionally gripped by both rollers. The gear 39 will remain in meshed engagement with the gear 38 over a considerable range of vertical movement so that the rollers will remain in geared together relationship throughout a wide range of nip openings, thereby accommodating strips of different thicknesses.

Figure 3:
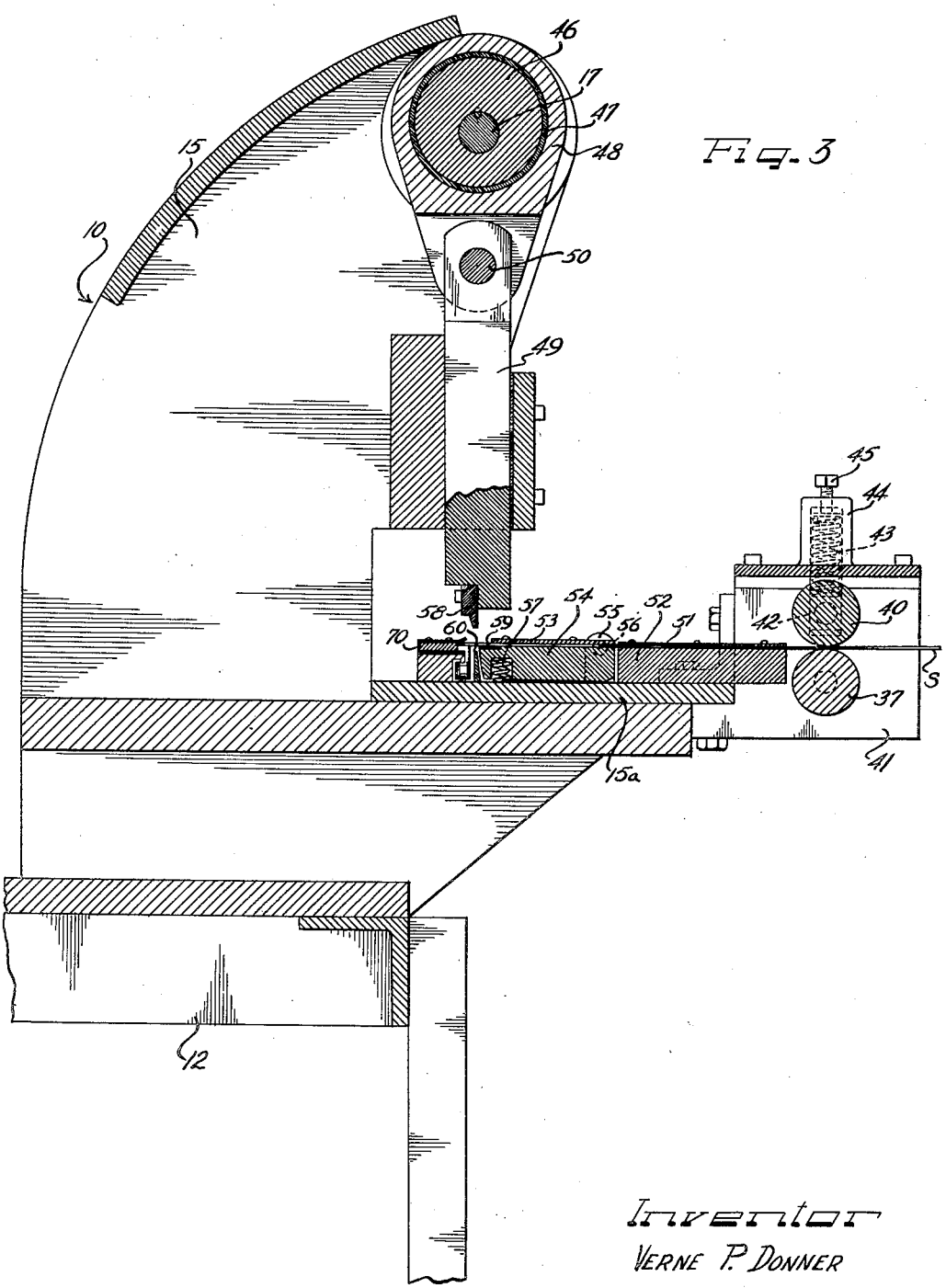
Figure 3 is a transverse cross-sectional view taken along the line III—III of Figure 1.

As shown in Figure 3, the shaft 17 has an eccentric 46 keyed thereon and surrounded by a bearing 47 in a yoke member 48. This yoke member 48 is positioned between the bearing supports 16 of the frame 15 as shown in Figure 1. As the shaft 17 is rotated, the eccentric 46 raises and lowers the yoke 48.

A shear block 49 is slidably mounted in a suitable guide on the frame 15 and is connected to the yoke 48 by a pivot pin 50. The shear block is thus vertically reciprocated as the eccentric raises and lowers the yoke 48.

As best shown in Figure 3, the metal strip S from the feed rollers 37 and 40 is fed through a slot 51 in a covered block 52 to a covered slot 53 through a feed table 54 which is rockably mounted on suitable pivots carried from a table plate 15a of the frame 15 on upstanding lugs or ears 55. The thus provided pivots 56 hold the feed table 54 against longitudinal or transverse shifting, but permit vertical pivoting of the table relative to the base plate 15a. A compression spring 57 acts between the bed plate 15a and the table 54 to urge the discharge and (rear end) of the table upwardly. This discharge end lies adjacent a cutter knife 58 mounted on the lower end of the shear block 49.

The discharge end of the feed table 54 projects beyond the covered slot portion thereof and has an insert 59 of tool steel or the like hard material mounted on the upper edge thereof to form a cutting edge for cooperation with the cutter knife 58. The strip S is fed over the top of this insert 59.

An upstanding rib 60 is mounted on the plate 15a in front of the rockable table 54 to provide a support for blanks B cut from the leading edge of the strip S as best shown in Figure 6. This rib cooperates with a support plate 61 on a block 62 to form a track or guide for the blanks B. A gap or slot 63 is provided between the plate and rib to receive upstanding ejector fingers 64 on an ejector chain 65 which has an upper run guided between spaced opposed lugs 66 above the base plate 15a.

The chain 65 as best shown in Figure 1 is trained around sprockets 66 and one of the sprockets is mounted on and driven from the shaft 33. A slip clutch 67 (Fig. 2) couples the sprocket 66 to the shaft 33 to accommodate idling of the sprocket whenever the load on the chain exceeds the load for which the clutch is set. The other sprocket 66 is freely rotatable on a shaft 68 suitably journaled in bearing supports such as 69 (Fig. 1) mounted on the frame 15.

The chain 65, as best shown in Figure 1, has an upper run traveling in the direction of the arrow toward the machine 11 and, as will hereinafter be more fully explained, the fingers 64 eject the blanks B in right angular relation to the strip S into the track 13 to supply them in end to end relation to the feed rollers 14 of the machine 11.

As shown in Figure 4, the spring 57 tilts the table 54 upwardly so that the strip S is guided above the tops of the fingers 64 and against an abutment block 70 adjustably mounted on top of the plate 61. This abutment block has a cover plate 71 mounted thereon with an upwardly tilted overhanging edge 71a to guide the leading end of the strip against the abutment block 70. The spacing of the abutment block from the discharge edge of the cutter insert 59 determines the length of the segment to be cut off from the leading end of the strip S thereby determining the width of the blank B. The abutment face of the block 70 is preferably grooved or otherwise relieved at its bottom edge 70a thereof so that the blank B deposited on the plate 61 and rib 60 will not be wedged between the abutment block and insert 59 as shown in Figure 6. The abutment block 70 can be adjustably positioned toward and away from the cutter insert 59 by loosening the screws 71b and sliding the block 70 within the limits of the slots 70b and 70c receiving the screws.

As shown in Figure 5, when the cutter knife 58 descends against the top of the strip S, it rocks the feed table 54 about its pivots 56 to compress the spring 57 and move the table against the bed plate 15a. Further downward movement of the cutting knife 58 thereupon shears off the leading end portion of the strip. During this shearing operation, the shear knife coacts with the hard insert member 59 and the cutting occurs at the leading edge of this insert member. It will be noted in Figure 5 that the downward movement of the table 54 and the strip S thereon moves the leading edge of the strip into the slot or gap 63 in the path of the fingers 64. Further downward movement of the cutter knife 58 immediately shears off the blank B as shown in Figure 6 and the blank is deposited on the rib 60 and plate 61 spanning the gap 63 whereupon a finger 64 engages the end of the blank and ejects it along the track 13 to the machine 11 in end to end relation with previously ejected blanks.

As soon as a blank is sheared from the leading end of the strip S, the face 58a of the cutter knife 58 adjacent the cutting edge of the insert piece 59 acts as an abutment for the new leading edge of the strip and prevents forward movement of the strip. When the leading edge of the strip is against the abutment block 70 or the abutment face 58a of the knife 58, the feed rollers 37 and 40 will slip relative to the strip S without damaging the strip. The length of the strip between the abutted leading edge and the nip of the feed rollers is held against buckling in the covered slots 51 and 53.

The blanks B ride freely on the rib 60 and plate 61, since the relieved portion 70a of the abutment block 70 provides ample clearance for the travel of the blanks.

After the cutting operation, the cutter knife 58 is raised by the block 49 and the spring 57 again tilts the feed table 54 upwardly to the position indicated in Figure 4. Further raising of the cutter knife 58 will clear the abutment face 58a thereof above the leading edge of the strip S, whereupon the feed rollers will immediately advance the strip to the abutment block 70, thus providing a new segment of the desired length for the next shearing operation.

The spring 57 is effective to maintain the leading edge of the strip S against the abutment face 58a of the cutter knife as soon as the blank B is severed from this leading edge so that the strip cannot be advanced by the feed rollers until the cut off blank B is ejected and the cutter and strip have been raised on the next stroke of the machine out of the path of the fingers 64.

From the above descriptions it should therefore be understood that the machine 10 of this invention cuts portions of the desired length from the leading edge of a strip S to form blanks B of the desired width and ejects these blanks in end to end relation at right angles to the strip. The ejection is effected with sufficient force to move the blanks to the feed rollers of a fabricating machine as they are needed. In the event of jamming of the blanks B in the track 13 or elsewhere, no damage to the ejection apparatus will occur, because the slip clutch 67 will permit relative movement between the actuating sprocket 66 for the ejection apparatus and the driving shaft 33. It will also be appreciated that the machine of this invention makes possible the continuous driving of the feed rollers acting on the strip S even though the strip is only intermittently advanced between cutting operations. The utilization of abutment faces for the leading edges of the strip both before and after each cutting operation and the provision of strip-confining slots or grooves between the nip of the feed rollers and these leading edges makes possible the slippage of the feed rollers on the strips without damaging the strips. The nip pressure of the feed rolls on the strip can be carefully regulated by the adjusting bolts 45. The machines of this invention can be operated at very high speed, or can be slowed down in accordance with the requirements of a fabricating machine receiving the blanks therefrom.

It will, of course, be understood that various details of construction may be varied through a wide range without departing from the principles of this invention and it is, therefore, not the purpose to limit the patent granted hereon otherwise than necessitated by the scope of the appended claims.

I claim as my invention:

1. A machine for feeding elongated material, for cutting the elongated material into blanks, and for feeding the blanks in desired relationship which comprises a pair of feed rolls defining a pressure nip for receiving elongated material therebetween to advance said material, means providing confined guide paths for the material advanced by said feed rolls, one of said means being rockable and having a cutting edge on the discharge end thereof for receiving the elongated material thereover, a reciprocal cutter coacting with said cutting edge to sever blanks from the leading end of the elongated material, an adjustable abutment means spaced from said edge and adapted to receive the leading edge of the elongated material thereagainst for gauging the width of blanks cut from said elongated material, spaced supports beneath said cutter for receiving blanks therefrom, ejector mechanism operating in the space between said spaced supports for ejecting the blanks from the machine, means for tilting said rockable means in an upward direction to move the elongated material above the ejector means between cutting operations, and means for continually driving said feed rolls to advance the elongated material against said abutment means whenever the cutting mechanism permits such advancement and to slip relative to the elongated material whenever the cutting mechanism prevents such advancement.

2. A machine for feeding strip stock, for cutting the strip stock into blanks, and for feeding the blanks in desired relationship which comprises feed rolls defining a pressure nip receiving the strip therebetween, means for continually driving the rolls to advance the strip, abutment means for the leading edge of the strip, means adjusting the nip pressure of the feed rolls to permit slippage between the feed rolls and strip when the leading edge of the strip is against said abutment means, a cutter mechanism for severing the leading edge of the strip to form a blank including a reciprocating cutter and a yieldable table for the blank, mounted for yieldable movement in the direction of cutting movement of the cutter, and ejector mechanism for receiving and supporting the severed blank and ejecting the blank for further treatment.

3. A blank forming machine which comprises a rockably mounted feed table having a strip-receiving slot extending therethrough, said table having a discharge end equipped with a cutting edge for receiving strip material thereover from said slot, spring means urging the discharge end of the table in an upward direction, a reciprocal cutter coacting with the cutting edge of said table for severing strip material projecting from said cutting edge, said cutter acting on top of the strip material to rock the table against the action of the spring for moving the strip material and forward end of the table downwardly, and ejector mechanism in the path of the downwardly moved leading end of the strip material for ejecting blanks severed from the strip by said cutting mechanism.

4. In a cutting machine, a rockable cutter table, means for feeding material to be cut over said table, said table having a discharge cutter edge, a cutter knife coacting with said discharge cutter edge to sever material thereon and to rock the table for moving the material to a different position, and ejector mechanism in the path of the moved material for ejecting blanks severed from the material as soon as the severing operation is completed.

5. Mechanism for cutting strip material into slugs and for ejecting the slugs in end to end relation which comprises a pair of feed rolls defining a pressure nip adapted to receive strip stock therebetween and advance the stock, an abutment block for the leading edge of the strip stock advanced by said rolls, means comprising a floating feed table for the blank yieldable in the direction of the cutting force applied thereto and having an advance edge defining a cutting edge spaced from said abutment block, means confining the strip stock between said rolls and said cutting edge to prevent buckling of the stock when the abutment means stops the forward motion of the stock whereby the rolls will slip on the stock, reciprocal cutter mechanism coacting with said edge to sever that portion of the stock lying between the abutment means and the edge, spaced support means for receiving severed blanks from the cutting mechanism, ejector fingers between said spaced support means for acting on the ends of the severed blanks, and means for advancing the ejector fingers against said ends of the blanks to discharge the blanks out of the machine in end to end relationship.

6. Cutting and feeding mechanism comprising a slidably mounted shear block, mechanism for raising and lowering said shear block, a cutter knife mounted on the lower end of said shear block, a rockably mounted feed table having a cutter edge coacting with said cutter knife beneath said shear block, spring means urging the discharge end of the feed table in an upward direction, an abutment block spaced from the discharge end of the feed table and coacting therewith to provide a gap of adjustable width for determining the width of blanks to be cut, means for feeding strip stock against the abutment block to span said gap, a chain having an upper run extending through said gap, ejector fingers mounted on said chain, and said cutter knife coacting with said cutter edge to rock the feed table downwardly against the action of said spring to move the material in said gap into the path of the ejector fingers whereby the ejector fingers will eject the blanks as soon as they are severed and the face of the cutter knife will prevent advancement of the material until the spring raises the feed table for moving the material above the ejector fingers.

7. A machine for making slugs of desired width from a strip of metal which comprises, guide means for said strip, feeder mechanism for pushing the strip through said guide means, an abutment block in spaced relation from the discharge end of said guide means, and in the path of said strip to be engaged by the leading end of the strip, said block being adjustable toward and away from said discharge end of the guide means to vary the space therebetween for gauging the length of the portion of the strip between said discharge end and the block, a cutter coacting with said discharge end to sever the thus gauged length from the strip and thereby produce a slug of desired width, an abutment face on said cutter for engaging the newly severed leading edge of the strip, ejector mechanism for engaging the slug when the strip is thus engaged by the abutment face of the cutter, and means for moving the strip out of the path of the ejector mechanism before the abutment face of the cutter releases the strip for movement to the abutment block.

8. A strip cutting and slug feeding apparatus comprising a feed table having a strip receiving slot therethrough and a cutter edge at the discharge end of the slot, feeder mechanism for pushing a strip through said slot, an abutment block spaced from the cutter edge of the table to engage the leading end of the strip, a first shaft rotatably mounted above said feed table, an eccentric on said shaft, a block suspended on said eccentric and slidable vertically toward and away from the cutter edge of the feed table, a cutter knife on said block and coacting with said edge to sever slugs from the strip having widths determined by the spaced relation of said abutment block and edge, said knife having an abutment face for engaging the newly severed leading edge of the strip, a second shaft driven by said first shaft, a slip clutch driven by said second shaft, a chain driven by said slip clutch and having an upper run in the space between the feed table and abutment block, ejector fingers on said chain for engaging slugs severed from the strip to sequentially discharge the slugs, means moving the feed table upwardly after the severing operation and before the abutment face releases the strip for shifting the leading end of the strip to a level above the tops of the ejector fingers, and means drivingly connecting the second shaft and feeder mechanism.

VERNE P. DONNER.

REFERENCES CITED

The following references are of record in the file of this patent:

UNITED STATES PATENTS

| Number | Name | Date |
|---|---|---|
| 642,901 | Glader | Feb. 6, 1900 |
| 2,032,098 | Roberts | Feb. 25, 1936 |
| 2,049,135 | Peyser | July 28, 1936 |
| 2,072,532 | Roedels | Mar. 2, 1937 |
| 2,156,049 | Boerger | Apr. 25, 1939 |
| 2,247,766 | Boerger | July 1, 1941 |